United States Patent [19]

Kawaguchi et al.

[11] Patent Number: 4,568,037
[45] Date of Patent: Feb. 4, 1986

[54] WEBBING TENSION DEVICE

[75] Inventors: Teruhiko Kawaguchi; Yuji Nishimura; Akinori Fujiwara, all of Aichi, Japan

[73] Assignee: Kabushiki Kaisha Toka-rika-denki-seisakusho, Aichi, Japan

[21] Appl. No.: 598,693

[22] Filed: Apr. 10, 1984

[30] Foreign Application Priority Data

Apr. 13, 1983 [JP] Japan .................. 58-055000[U]

[51] Int. Cl.[4] .................. A62B 35/02; B65H 75/48
[52] U.S. Cl. .................................... 242/107; 280/806
[58] Field of Search .......... 242/107, 107.4 R–107.4 E; 280/803, 806–808; 297/475–480

[56] References Cited

U.S. PATENT DOCUMENTS

| | | | |
|---|---|---|---|
| 2,883,123 | 4/1959 | Finnigan | 242/107.4 R |
| 4,423,846 | 1/1984 | Fohl | 242/107 |
| 4,447,017 | 5/1984 | Inukai | 242/107 |
| 4,471,918 | 9/1984 | Ando | 242/107 |

Primary Examiner—John M. Jillions
Attorney, Agent, or Firm—Thomas W. Cole

[57] ABSTRACT

In a webbing tension device adapted for use in a webbing retractor wherein clutch means is provided for putting a webbing takeup shaft and an operation wheel biased by resilient means in a connected situation in an emergency situation of an vehicle and for putting them in a disconnected situation in an ordinary running situation of the vehicle, the clutch means is provided with lever means opposed to a gear wheel fixed to the takeup shaft and the lever means is caused to abut on the operation wheel when the lever means is latched to the gear wheel in the emergency situation of the vehicle, whereby a compression force acting upon the lever means in the emergency situation is supplementally sustained.

Accordingly, the lever means is reinforced without using large-sized clutch means.

19 Claims, 5 Drawing Figures

WEBBING TENSION DEVICE

BACKGROUND OF THE INVENTION

1. Field of the Invention

The present invention relates to a webbing tension device for imparting a slack-eliminating tension to a vehicle seat belt during an emergency situation of a vehicle in order to closely and safely restrain the occupants of the vehicle.

2. Description of the Prior Art

Seat belt systems for protecting vehicle occupants in emergency situations are known, wherein one end portion of the webbing is retracted in layers into a webbing retractor and fastened about the occupant so that the occupant is restrained by the webbing during an emergency situation of a vehicle.

The webbing retractor which retracts the webbing imparts a predetermined tension to the webbing, but the retracting force of the webbing retractor is either made relatively weak or non-existent in order to form a clearance or "slack" between the occupant and the webbing fastened thereabout, so as not to unduly squeeze the occupant during the normal operation of the vehicle.

However, in an emergency situation of a vehicle, such as a collision, the occupant is propelled in the direction of the collision by the clearance amount until finally restricted by the webbing.

To eliminate this slack in the webbing and the resulting injuries which may result therefrom in an emergency situation of a vehicle, a webbing tension device has been proposed in the prior art which transmits a biasing force from a spiral spring to a webbing takeup shaft located within the webbing retractor, thereby imparting a substantial tension to the webbing. In such a device, only a biasing force from a small spiral spring acts upon the takeup shaft in ordinary running of the vehicle, so that the tension of the webbing is normally kept relatively low. However, in an emergency situation of a vehicle, trigger means disposed in the webbing tension device couples a biasing force of a large spiral spring to the takeup shaft through a clutch means, thereby imparting a considerable retracting tension to the webbing. The clutch means of the webbing tension device includes an operation wheel for receiving the biasing force of the large spiral spring, and a gear wheel fixed to the takeup shaft. The operation wheel and gear wheel are connected to each other through a lever means actuated by an emergency situation of a vehicle, and the biasing force of the large spiral spring is imparted strikingly to the lever means. The problem with this device is that the clutch lever means must be manufactured heavily in order to be tough enough to withstand large forces, which in turn causes the clutch means to be made large-sized.

SUMMARY OF THE INVENTION

The present invention has as its object the provision of a webbing tension device adapted for use in a seat belt system for protecting an occupant in an emergency situation of a vehicle, which is provided with a clutch means improved in both size and toughness. In this clutch means, at least one lever means is provided which is rotatably mounted on an operation wheel through a supporting means. A portion of the outer periphery of the lever means about the supporting means is opposed to and received in a recess provided in the operation wheel, whereby a compressive force acting upon the lever means in an emergency situation of a vehicle provides the clutching force of the clutch means. Thus, the invention provides a lever means which is compact yet tough, and which considerably reduces the size of the resulting clutch.

Description will herein be given of an embodiment with reference to the drawings attached hereto.

DETAILED DESCRIPTION OF THE PREFERRED EMBODIMENT

Figure 1:
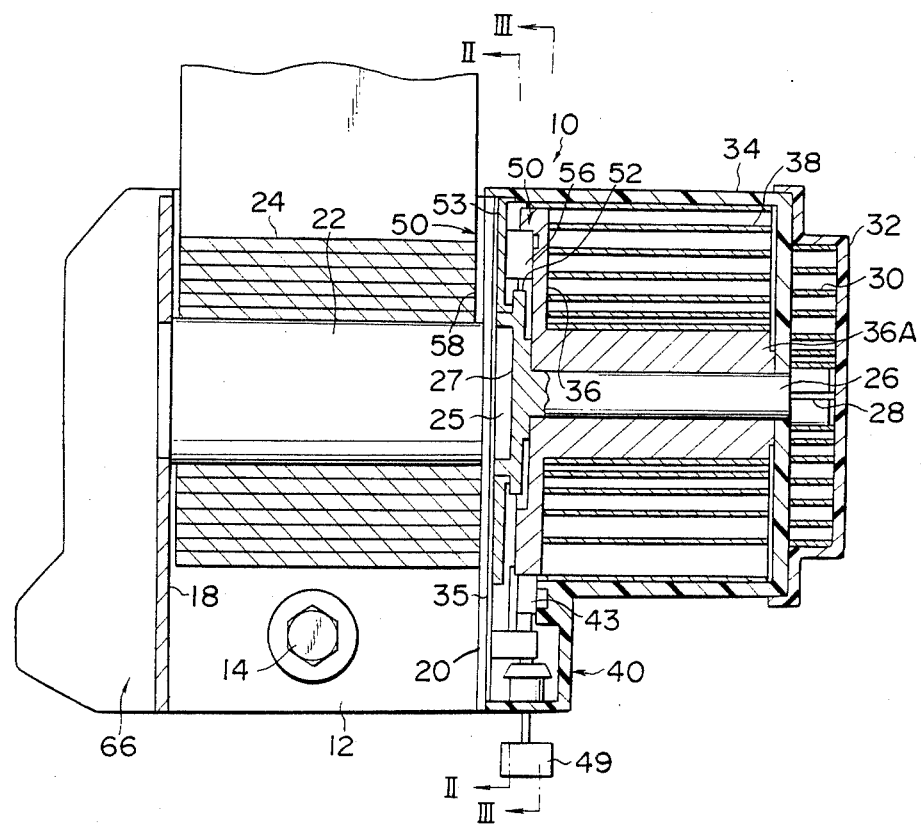
FIG. 1 is a sectional view showing a webbing retractor to which a webbing tension device according to the present invention is applied.

FIG. 1 shows a structure in which a webbing tension device according to the present invention is assembled within a webbing retractor 10.

In the webbing retractor 10, a frame 12 is fixed to a vehicle body 16 through a bolt 14. A pair of leg plates 18 and 20 (best seen in FIG. 4) extend from both side portions of the frame 12 in parallel with each other, and the frame 12 rotatably supports both end portions of a takeup shaft 22. Secured to an intermediate portion of the takeup shaft 22 is one end of an occupant-restraining webbing 24. The other end of the webbing 24 is secured with a tongue plate (not shown). The tongue plate is latched to a buckle device (not shown), whereby an intermediate portion of the webbing 24 can be fastened about an occupant. Thus far, the construction described is substantially the same as that of a conventional webbing retractor.

One end portion of the takeup shaft 22 extends through the leg plate 20 and is formed with a rectangular axial portion 25 which is received in a rectangular hole 27 formed at one end of a small diameter rod 26, so that the small diameter rod 26 is coaxially connected to the takeup shaft 22. The small diameter rod 26 is formed at its forward end portion with a slit 28 in which the inner end of a small spiral spring 30 is received. The small spiral spring 30 is housed in a small spring case 32 and an outer end thereof is fixed to the small spring case 32. The small spring case 32 is connected to the leg plate 20 through a large spring case 34, and a sheet 35 secured closely to the leg plate 20. The small spiral spring 30 weakly biases the takeup shaft 22 in a retractive direction (in the direction of arrow A in FIGS. 2 and 3), whereby the small spiral spring 30 acts to cause the webbing 24 to contact slightly with the occupant when the webbing 24 is fastened over the occupant.

Rotatably supported on an outer periphery of the small diameter rod 26 is a cylindrical portion 36A of an operation wheel 36. The cylindrical portion 36A is connected to an inner end of a large spiral spring 38, which is also a resilient means, the outer end of which is fixed to an inner periphery of the large spring case 34. The biasing force of the large spiral spring 38 is larger than that of the small spiral spring 30, and the large spiral spring 38 biases the operation wheel in a direction of retraction of the webbing 24. However, the operation wheel 36 is prevented from rotation in the direction of retraction by trigger means 40 in an ordinary running situation of the vehicle, and only in an emergency situation thereof is the operation wheel 36 allowed to rotate in a retractive direction by the large spiral spring 30.

Figure 2:
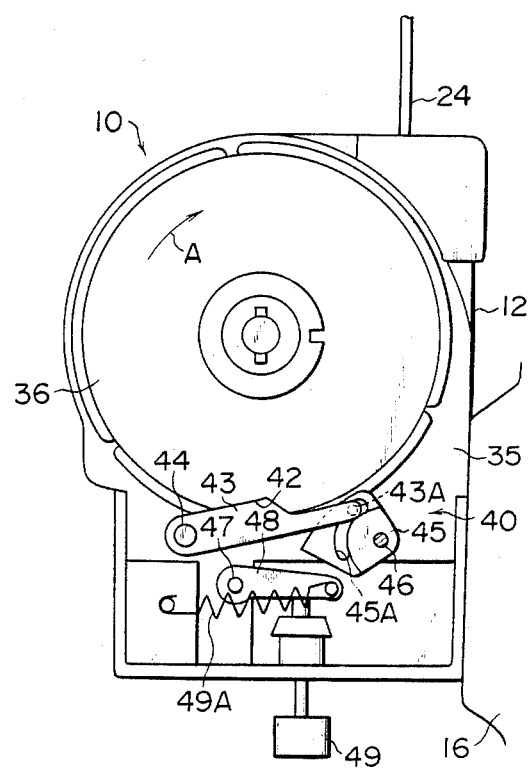
FIG. 2 is a sectional view taken along a line II—II of FIG. 1.
Figure 4:
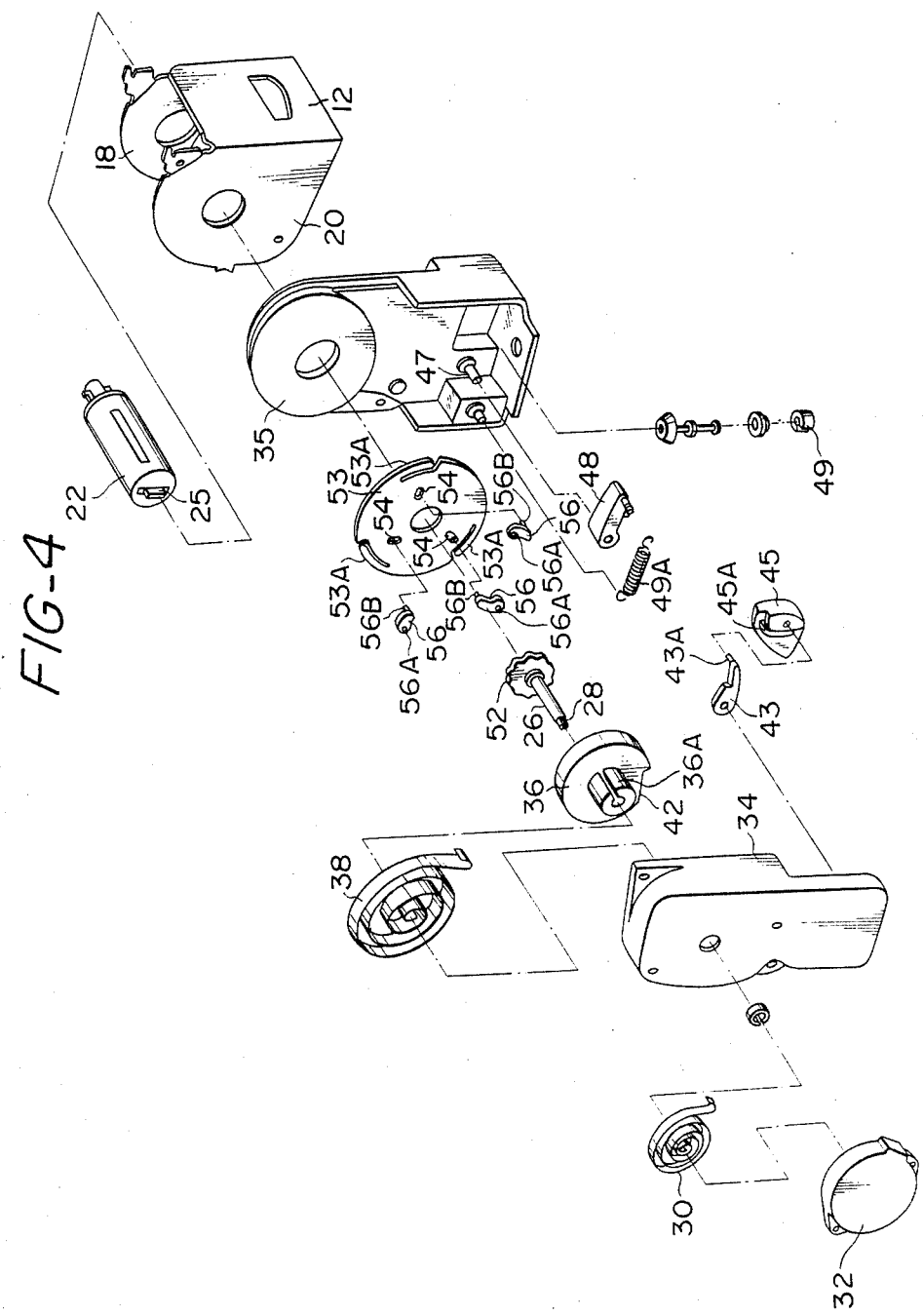
FIG. 4 is a disassembled perspective view of the present embodiment.

As shown in FIGS. 2 and 4, the trigger means 40 generally comprises a pawl 43 which is normally latched into a notch 42 formed on the operation wheel 36. The pawl 43 is pivotally mounted on the large spring case 34 through a pin 44, and in an emergency situation of the vehicle, the pawl 43 may be unlatched from notch 42 on the operation wheel 36 by a cam 45. Cam 45 is also pivotally mounted onto the large spring case 34 through a pin 46. Moreover, a pin 43A of the pawl 43 is received in a curved guide groove 45A formed on the cam 45.

Opposed to the cam 45 is a sensor lever 48 pivotally mounted onto the sheet 35 through a pin 47. The cam 45 and the sensor lever 48 are preferably slightly separated from each other. The sensor lever 48 engages the top portion of a pendulum 49 hung from the bottom of the sheet 35.

As is best seen with respect to FIG. 2, the curved guide groove 45A of cam 45 is roughly shaped in the form an inverted "L". Normally, the cam 45 is positioned so that the pin 43A of the pawl 43 is maintained within the upper portion of the inverted L-shped guide groove 45A, whereby the bend in the inverted L-shaped guide groove prevents the pin 43A from sliding into the lower portion of the groove 45A. Accordingly, the pawl 43 is maintained in a latching position relative to the operation wheel 36. In an emergency situation of the vehicle, however, when the pendulum 49 is swung sharply in response to an abnormal change in the acceleration of the vehicle, the upper portion of the pendulum 49 pushes up the sensor lever 48 so that the axial line of coil spring 49A passes the axial center of the pin 47. Once this occurs, the spring 49A acts to forcefully pivot the lever 48 against the bottom of the cam 45. The cam 45 is in turn rotatably moved so that the pin 43A of the pawl 43 is allowed to slide around the restraining bend in the inverted L-shaped guide groove 45A, all the way to the end of the vertical portion of this groove, whereby the pawl 43 is unlatched from the notch 42 in the operation wheel 36. It should be noted that, at every point in time, pawl 43 is biased downwardly due to the ramp-shape of the notch 42 in the operation wheel 36 (see FIG. 4), and the rotational bias that spiral spring 38 applies to wheel 36.

Disposed between the operation wheel 36 and the takeup shaft 22 is a clutch means 50. In the ordinary running situation of the vehicle, the operation wheel 36 and the takeup shaft 22 are disconnected from one another, and only in an emergency situation of the vehicle are they mutually engaged so that a rotation of the operation wheel 36 is transmitted to the takeup shaft 22. The clutch means 50 includes a gear wheel 52 formed with sinusoidal teeth at its outer periphery which is connected at its center of rotation to one end of the takeup shaft 22. Clutch means 50 further includes a friction plate 53 which has a plurality of levers 56 guided along elongated guide holes 54. The guide holes 54 are chordally oriented with respect to the friction plate 53, and extend underneath the outer periphery of gear wheel 52 (see FIG. 3), so that the levers 56 may engage the gear wheel 52 when the operation wheel 36 rotates relative to the friction plate 53 in an emergency situation of the vehicle.

Figure 3:
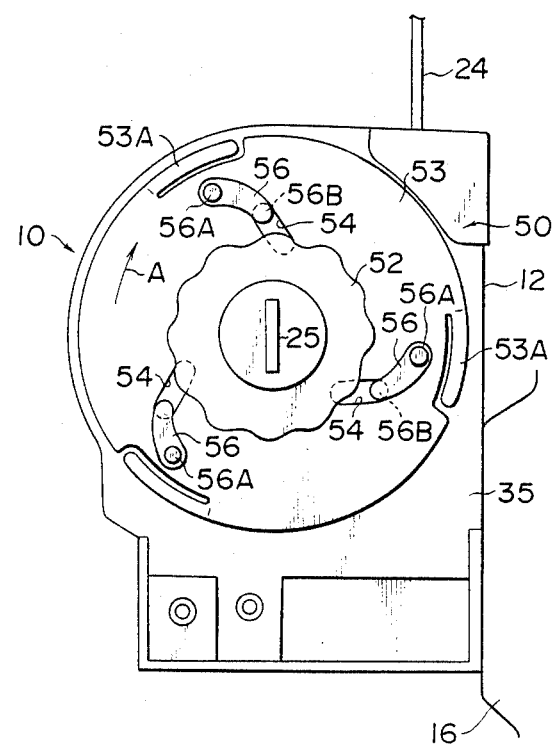
FIG. 3 is a sectional view taken along a line III—III of FIG. 1.
Figure 5:
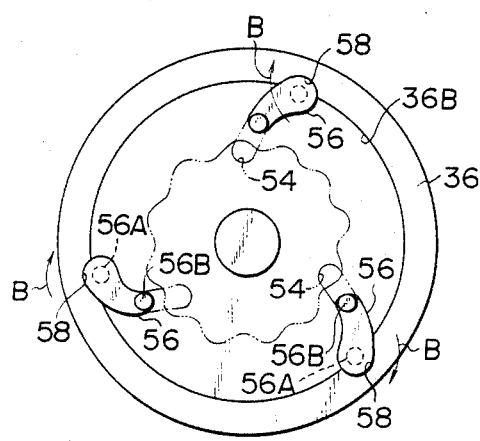
FIG. 5 is a front view showing an assembly of an operation wheel and a plurality of radially located levers.

The friction plate 53 is rotatably supported by the rectangular portion 25 of the takeup shaft 22 and is coaxially disposed thereto. Friction plate 53 includes arms 53a formed on its periphery which frictionally engage the sheet 35 for a purpose which will become evident hereinafter. Contained within circular recess portion 36B formed within the periphery of the operation wheel 36, as shown in FIG. 5, each lever 56 includes a pin 56A provided on its base portion which is received within a circular hole formed on the operation wheel 36, so that the base of each pin 56 is pivotally mounted on the periphery of the operation wheel 36. Furthermore, each of the levers 56 is formed with a pin 56B (projected in reverse direction to the direction of the pin 56A) which is received in one of the previously mentioned guide holes 54 of the friction plate 53. The friction plate 53 is disposed such that the pins 56B of each of the levers 56 are positioned at the outermost ends of the respective guide holes 54 in an ordinary running situation of the vehicle, as shown in FIG. 3, so that the levers 56 are separated from the gear wheel 52. In an emergency situation of the vehicle, however, when the operation wheel 36 is forcefully rotated by spring 38, the pins 56B of the levers 56 are chordally guided along the guide holes 54 until their ends engage the sinusoidal teeth of the gear wheel 52, whereby a rotating force of the operation wheel 36 is transmitted to the levers 56 as a compression force so that the gear wheel 52 is rotated in a direction of retraction of the webbing 24.

As shown in FIG. 5, the operation wheel 36 is formed with arc-shaped grooves 58 which enlarge the inner diameter of the circular recess portion 36B partially. These arc-shaped grooves 58 receive the arc-shaped base portions of the respective levers 56. End portions of the respective arc-shaped grooves 58 are caused to abut on intermediate portions contiguous to the arc-shaped portions of the lever 56, whereby the pins 56B are prevented from rotation in the direction of the outermost ends of the guide holes 54, i.e., in a clockwise direction (see arrow B of FIG. 5). Also, in an emergency situation of the vehicle, the arc-shaped grooves 58 support compression forces of the levers 56 receiving the rotating force of the operation wheel 36.

The end portion of the takeup shaft 22 extending through the leg plate 18 is provided with an inertial locking mechanism 66 (a detailed description of which is omitted), so that the takeup shaft 22 is prevented from rotating in a direction which would allow an unwinding of the webbing 24 in an emergency situation of the vehicle.

Description will now be given of the operation of the embodiment thus described.

The occupant can unwind the webbing 24 from the takeup shaft 22 and can fasten it about him; at this time, as the biasing force of the small spiral spring 30 acts upon the webbing 24, the webbing 24 applies only a slight retractive force against the occupant. In the ordinary running situation of the vehicle, the inertial locking mechanism 66 is not actuated, and therefore, the occupant can change his attitude voluntarily, i.e., the webbing can be unwound voluntarily. However, when the vehicle experiences an emergency situation such as a collision, the pendulum 49 swings and pushes up the sensor lever 48, which in turn rotates the cam 45 by virtue of the pivoting force that spring 49A applies to lever 48. The pin 43A of the pawl 43 is pushed down through the inverted L-shaped groove 45A of the cam 45 as a result of the biasing force that the large spiral spring 38 applies to the operation wheel 36, so that the pawl 43 is released from the notch 42 of the operation wheel 36. The operation wheel 36 then rotates in the direction of retraction of the webbing 24 by virtue of the biasing force of the large spiral spring 38. Because the arms 53A of the friction plate 53 cause the plate 53 to frictionally engage sheet 35, plate 53 initially remains stationary with respect to the operation wheel 36. However, as operation wheel 36 begins to rotate, the bottom portions of the levers 56 pivot within their respective grooves 58, and the pins 56B on the top portions of the levers 56 slide along the guide holes 54 of the friction plate 53, and ultimately engage the sinusoidal teeth of the gear wheel 52. As a result, the operation wheel 36 is connected to the gear wheel 52 and the biasing force of the large spiral spring 38 is transmitted to the takeup shaft 22. After the operation wheel 36 and the gear wheel 52 are connected to each other, the spiral spring 38 overcomes the frictional retaining force applied by the arms 53A of the plate 53 against sheet 35, and the friction plate 53 rotates together with the operation wheel 36. At this time, the levers 56 are subjected to radially oriented compression forces, but as the arc-shaped bottom portions of the respective levers 56 are oriented in the arc-shaped grooves 58, these compression forces are absorbed by the arc-shaped grooves 58, and the pins 56 are protected from injury.

As a result, the takeup shaft 22 retracts the webbbing 24 thereon to impart a slack-eliminating tension to the webbing 24, whereby the clearance between the occupant and the webbing 24 is cancelled or removed. Since the inertial locking mechanism 66 simultaneously prevents any webbing 24 from unwinding from the takeup shaft 22, the occupant is safely secured within the webbing 24 during the entire emergency event.

We claim:
1. A webbing tension device adapted for use in a webbing retractor for protecting an occupant in an emergency situation of a vehicle, which comprises:
  (a) a frame fixed to the vehicle body;
  (b) a takeup shaft rotatably supported within the frame for retracting an occupant restraining webbing thereon;
  (c) an operation wheel rotatably supported within the frame and mounted on the takeup shaft, wherein said operation wheel includes a peripheral wall;
  (d) a first resilient means for biasing the operation wheel in a webbing retracting direction;
  (e) trigger means latched to the operation wheel for preventing the operation wheel from rotating in a webbing retracting direction in the ordinary running situation of the vehicle, but releasable from the operation wheel in an emergency situation of the vehicle in order to allow said operation wheel to rotate under such an emergency situation, and
  (f) a clutch means disposed between the takeup shaft and the operation wheel for connecting the takeup shaft and the operation wheel in an emergency situation of the vehicle which includes at least one lever means pivotally mounted on the operation wheel through a supporting means, wherein said lever means includes a rear end portion pivotable within a notch located on the inner wall of the peripheral wall of the operation wheel, a gear wheel fixed to the takeup shaft and opposed to a forward end portion of the lever means, and a clutch plate having means for causing the forward end portion of the lever means to slide into and latch to the gear wheel, whereby the rear end portion of the lever means compressibly engages the notch in the peripheral wall of the operation wheel, and the forward end portion of the lever means slides into and latches within the gear wheel whenever said trigger means unlatches the operation wheel and allows the first resilient means to rotate the operation wheel in a webbing retracting direction.

2. A webbing tension device as set forth in claim 1, wherein the supporting means comprises a protrusion formed on the lever means and a supporting hole formed on the operation wheel and receiving the protrusion therein, whereby the lever means is pivotally supported on the operation wheel.

3. A webbing tension device as set forth in claim 2, wherein both the rear end portion of the lever means and the notch on the peripheral wall of the operation wheel which receives it are formed in an arcuate shape.

4. A webbing tension device as set forth in claim 3, wherein the lever means is formed at its forward end portion with a projection projected in a reverse direction to the protrusion of the lever means, the clutch plate is formed with a guide hole, and the projection is received in the guide hole, whereby the lever means is guided along the guide hole and the forward end of the lever means is latched to the gear wheel in an emergency situation of the vehicle.

5. A webbing tension device as set forth in claim 4, which further comprises a second resilient means connected to the takeup shaft for biasing the shaft in a direction of retraction of the webbing, wherein the biasing force of the second resilient means is substantially weaker than that of the first resilient means in order to slightly bias the takeup shaft in the direction of retraction in order to withdraw any slack of the webbing fastened about the occupant.

6. A webbing tension device as set forth in claim 5, wherein the clutch plate is formed at its peripheral portion with an arm which abuts against a sheet disposed adjacent to the clutch plate, whereby the clutch plate is subjected to a friction force when it rotates.

7. A webbing tension device as set forth in claim 6, wherein the trigger means comprises a pawl latched to the operation wheel to stop the webbing retracting rotation thereof in an ordinary running situation of the vehicle, cam means for supporting the pawl in a latched position, a sensor lever for rotating the cam means to release the pawl from the operation wheel, and a pendulum for detecting a sudden acceleration of the vehicle, whereby, when the pendulum detects an abnormal acceleration of the vehicle, the sensor lever is pushed up to rotate the cam means so that the pawl releases the operation wheel.

8. A webbing tension device as set forth in claim 7, wherein the lever means comprises a plurality of levers disposed along the periphery of the operation wheel at uniform intervals.

9. In a webbing tension device adapted for use in a webbing retractor for protecting an occupant in an emergency situation of a vehicle which includes a webbing takeup shaft for retracting an occupant restraining webbing thereon which is rotatably supported by a frame fixed to the vehicle body, and which is biased in a direction of retraction of the webbing by a small spiral spring, an operation wheel rotatably mounted within the frame through the takeup shaft which is biased in the direction of retraction of the webbing by a large spiral spring, a trigger means for latching the operation wheel in an ordinary running situation of the vehicle which releases the operation wheel in an emergency situation, and clutch means between the takeup shaft and the operation wheel which maintains the takeup shaft and the operation wheel in a disconnected state in an ordinary running situation of the vehicle but which connects them in an emergency situation of the vehicle, wherein the improvement comprises a lever means in the clutch means which is pivotally mounted on the operation wheel through supporting means, a gear wheel fixed to the takeup shaft which include teeth which are opposed to a forward end portion of the lever means, and a clutch plate for causing the forward end portion of the lever means to latch into the gear wheel teeth in an emergency situation of the vehicle, wherein the outer rear periphery of the lever means about the supporting means is opposed to and received in a recess formed on the operation wheel, whereby a compression force acting between the lever means and the operation wheel causes the gear wheel and the operation wheel to become connected when said trigger means unlatches the operation wheel.

10. A webbing tension device as set forth in claim 9, wherein the supporting means comprises a protrusion formed on the lever means and a supporting hole formed on the operation wheel and receiving the protrusion therein, whereby the lever means is pivotally supported onto the operation wheel.

11. A webbing tension device as set forth in claim 10, wherein the rear outer periphery of the lever means is formed in an arc shape and the recess of the operation wheel is formed in a complementary arc shape.

12. A webbing tension device as set forth in claim 10, wherein the lever means is formed at its forward end portion with a projection projected in a reverse direction to the protrusion of the lever means, the clutch plate is formed with a guide hole, and the projection is received in the guide hole, whereby the lever means is guided along the guide hole and the forward end of the lever means is latched to the gear wheel in an emergency situation of the vehicle.

13. A webbing tension device as set forth in claim 12, wherein the clutch plate is formed at its peripheral portion with an arm and the arm is caused to abut against a sheet disposed adjacent to the clutch plate, whereby the clutch plate is subjected to a friction force at a time of its rotation.

14. A webbing tension device as set forth in claim 13, wherein the trigger means comprises a pawl latched to the operation wheel to stop a rotation thereof, cam means supporting the latched situation of the pawl, a sensor lever rotating the cam means to put the pawl in a releasable situation with respect to the operation wheel, and a pendulum for detecting an abnormal acceleration of the vehicle, whereby the pendulum pushes up the sensor lever to rotate the cam means so that the pawl releases the operation wheel.

15. A webbing tension device as set forth in claim 14, wherein the lever means comprises a plurality of levers peripherally disposed around the operation wheel at a same interval.

16. A webbing tension device adapted for use in a webbing retractor for protecting an occupant in an emergency situation of a vehicle, which comprises:
  (a) a frame fixed to a vehicle body;
  (b) a webbing takeup shaft rotatably mounted on the frame for retracting an occupant restraining webbing wound thereon;
  (c) a small diameter rod fixed at its one end to one end of the takeup shaft coaxially therewith;
  (d) an operation wheel rotatably mounted on the small diameter rod;
  (e) a large spiral spring for substantially biasing the operation wheel in a direction of retraction of the webbing;
  (f) a small spiral spring for slightly biasing the small diameter rod in the direction of the retraction of the webbing;
  (g) a pawl for latching the operation wheel in an ordinary running situation of the vehicle;
  (h) a pendulum for releasing the pawl from the operation wheel in an emergency situation of the vehicle; and
  (i) a clutch means for connected the takeup shaft and the operation wheel in an emergency situation of the vehicle, including at least one lever means pivotally mounted on the operation wheel through supporting means, a gear wheel fixed to the takeup shaft and opposed to a forward end portion of the lever means, and a clutch plate for causing the forward end of the lever means to latch to the teeth of the gear wheel in an emergency situation of the vehicle, a portion of the rear outer periphery of the lever means about the supporting means being opposed to and received in a recess formed on the operation wheel, whereby a compression force acting between the lever means and the operation wheel mechanically connects the gear wheel and the operation wheel.

17. A webbing tension device as set forth in claim 16, wherein the supporting means comprises a protrusion formed on the lever means and a supporting hole formed on the operation wheel and receiving the protrusion therein, whereby the lever means is pivotally mounted on the operation wheel.

18. A webbing tension device as set forth in claim 17, wherein the rear portion of the outer periphery of the lever means is formed in an arc shape and the recess of the operation wheel is formed in an arc shape.

19. A webbing tension device as set forth in claim 18, wherein the outer periphery of the rear base portion of the lever means is formed in an arcuate shape which is complementary to the arcuate shape of the recess of the operation wheel.

* * * * *